(12) United States Patent
Weber et al.

(10) Patent No.: US 8,378,054 B2
(45) Date of Patent: Feb. 19, 2013

(54) METHOD FOR PRODUCING POLYARYL ETHERS

(75) Inventors: Martin Weber, Maikammer (DE); Volker Warzelhan, Weisenheim (DE); Faissal-Ali El-Toufaili, Ludwigshafen (DE); Andreas Greiner, Amöneburg (DE); Heiner Stange, Neuss (DE); Seema Agrarwal, Marburg (DE)

(73) Assignee: BASF SE (DE)

( * ) Notice: Subject to any disclaimer, the term of this patent is extended or adjusted under 35 U.S.C. 154(b) by 7 days.

(21) Appl. No.: 12/742,855

(22) PCT Filed: Nov. 11, 2008

(86) PCT No.: PCT/EP2008/065273
§ 371 (c)(1),
(2), (4) Date: May 13, 2010

(87) PCT Pub. No.: WO2009/062923
PCT Pub. Date: May 22, 2009

(65) Prior Publication Data
US 2010/0286303 A1    Nov. 11, 2010

(30) Foreign Application Priority Data
Nov. 13, 2007  (EP) ..................................... 07120546

(51) Int. Cl.
*C08G 75/00* (2006.01)

(52) U.S. Cl. ........ 528/171; 528/391; 528/125; 525/344; 525/353; 568/613; 568/624; 568/620; 521/171; 521/180; 427/508; 427/553; 427/595

(58) Field of Classification Search .................. 528/125, 528/391, 171; 525/344, 353; 568/613, 624, 568/620; 521/171, 180; 427/508, 553, 595
See application file for complete search history.

(56) References Cited

U.S. PATENT DOCUMENTS

| 4,767,838 | A | * | 8/1988 | Clendinning et al. ........ 528/125 |
| 4,870,153 | A | | 9/1989 | Matzner et al. |
| 5,008,364 | A | | 4/1991 | Ittemann et al. |
| 5,631,333 | A | | 5/1997 | Weber et al. |
| 2005/0176923 | A1 | | 8/2005 | El-Hibri |
| 2009/0275725 | A1 | | 11/2009 | Dienes et al. |

FOREIGN PATENT DOCUMENTS

| DE | 2917903 A1 | 11/1979 |
| DE | 3721337 A1 | 1/1989 |
| EP | 113112 A1 | 7/1984 |
| EP | 127852 A1 | 12/1984 |
| EP | 135130 A2 | 3/1985 |
| EP | 215580 A2 | 3/1987 |
| EP | 297363 A2 | 1/1989 |
| EP | 663426 A2 | 7/1995 |
| GB | 1 153 035 A | 5/1969 |
| GB | 1152035 A | 5/1969 |
| GB | 2020300 A | 11/1979 |
| WO | WO-2007/147759 A1 | 12/2007 |
| WO | WO-2009/000741 A1 | 12/2008 |
| WO | WO-2009/030620 A1 | 3/2009 |

OTHER PUBLICATIONS

Brunel, R., et al., Assisted microwave synthesis of high molecular weight poly(aryletherketone)s, High Proformance Polymers, 2007, pp. 1-23, online publication.

Chatti, S., et al., "Efficient synthesis of polyethers from isosorbide by microwave-assisted phase transfer catalysis," European Polymer Journal, 2002, vol. 38, pp. 1851-1861.

Gedye, R., et al., "The use of microwave ovens for rapid organic synthesis," Tetrahedron Letters, 1986, vol. 27, No. 3, pp. 279-282.

Hurduc, N., et al., Microwave effects in he synthesis of polyethers by phase transfer catalysis, Eur. Polym. J., 1997, vol. 33, No. 2, pp. 187-190.

Mallakpour, S. and Kowsari, E., "Soluble novel optically active poly(amide-imide)s derived from N,N'-(4,4'-oxydiphthaloyl)-bis-L-leucine diacid chloride and various aromatic diamines: synthesis and characterization," J Appl Polym Sci, 2005, vol. 96, pp. 435-442.

Srinivasan, S.A., et al., "Amorphous phenolphthalein-based poly(arylene ether)-modified cyanate ester networks: microwave processing," J. Appl. Polym. Sci., 1997, vol. 64, pp. 179-190.

\* cited by examiner

*Primary Examiner* — Shane Fang
(74) *Attorney, Agent, or Firm* — Connolly Bove Lodge & Hutz LLP

(57) ABSTRACT

A process for preparing polyaryl ethers in which a polycondensation of the monomer building blocks is carried out using microwave irradiation leads to thermoplastic molding compositions having improved color properties.

7 Claims, No Drawings

METHOD FOR PRODUCING POLYARYL ETHERS

CROSS-REFERENCE TO RELATED APPLICATIONS

This application is a national stage application (under 35 U.S.C. §371) of PCT/EP2008/065273, filed Nov. 11, 2008, which claims benefit of European application 07120546.2, filed Nov. 13, 2007.

BACKGROUNND OF THE INVENTION

The present invention relates to a process for preparing polyaryl ethers and molding compositions based on polyaryl ethers. The polyaryl ethers prepared using radiation in the microwave region, in particular polysulfones (PES), polyether sulfones (PES) and polyphenyl sulfones (PPSU), have improved mechanical and optical properties in molding compositions. In particular, the thermoplastic molding compositions have an improved intrinsic color.

In addition, the present invention relates to the use of such molding compositions for producing moldings, films, membranes and foams.

Polyaryl ethers belong to the group of high-performance thermoplastics and have a high heat distortion resistance, good mechanical properties and an inherent flame resistance (see E. M. Koch, H.-M. Walter, Kunststoffe 80 (1990) 1146; E. Döring, Kunststoffe 80 (1990) 1149). Owing to their good biocompatibility, polyaryl ethers are also used as material for producing medical materials such as dialysis membranes. (S. Savariar et al., Desalination 144 (2002) 15).

The polyaryl ethers are usually prepared by thermal polycondensation of suitable monomer building blocks in dipolar aprotic solvents at elevated temperature (see R. N. Johnson et al, J. Polym. Sci. A-1 5 (1967) 2375; J. E. McGrath et al., Polymer 25 (1984) 1827).

Molding compositions comprising various polyaryl ethers have been known from the literature for some years. EP-A 215 580, for example, describes miscible, i.e. single-phase, blends of two or more polyarylene ether sulfones comprising recurring units of the following building blocks:

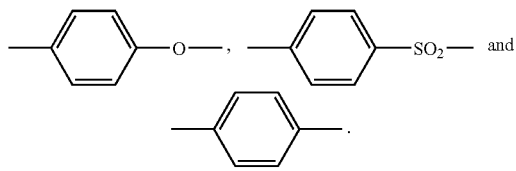

Compositions for producing, for example, semipermeable membranes, which are obtained by mixing pulverulent polyarylene ether sulfones of which one polymer consists essentially of the structural units (I) and the other polymer consist essentially of structural units (II):

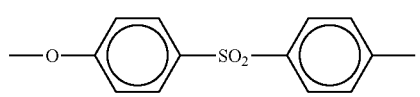
(I)

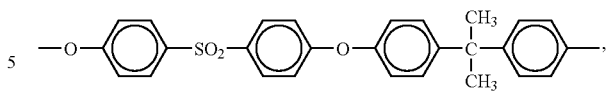
(II)

are known to those skilled in the art from DE-A 2 917 903.

EP-A 127 852 discloses a polyaryl ether comprising a mixture of polyarylene ether sulfones comprising the following recurring units (III)

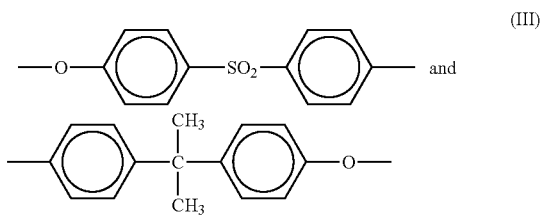
(III)

and ones comprising the abovementioned structural units (I) and (II).

Furthermore, EP-A 663 426 discloses polymer blends based on a copolyaryl ether comprising from 91 to 97 mol % of structural units (I) and from 3 to 9% by weight of structural units (II) together with a disperse phase comprising a further copolyaryl ether which has from 91 to 97 mol % of structural units (II) and from 3 to 9 mol % of structural units (I). These blends have an improved flowability, a reduced blistering tendency and an improved resistance to chemicals.

Various processes for the thermal preparation of polyarylene ether sulfones from aromatic bishalogen compounds and aromatic bisphenols or their salts in the presence of at least one alkali metal carbonate or ammonium carbonate or ammonium hydrogencarbonate in an aprotic solvent are known to those skilled in the art.

In U.S. Pat. No. 4,870,153, for example, polyaryl ethers comprising naphthalene and terphenylene structures are obtained under the action of heat energy. For this purpose, naphthalenediphenol salts, for example, are reacted with a phenyl ether dibromide in a condensation reaction.

EP-A 113 112 describes thermoplastic polymers which are obtained from three different monomer building blocks by a thermal condensation reaction. For this purpose, a polymerization is carried out at temperatures of from 120° C. to 180° C. using equimolar amounts of the corresponding hydroxyl compounds and the halogen compounds in the presence of an alkali metal carbonate.

EP-A 297 363 describes high-temperature-resistant molding compositions which are made up of polyaryl ether sulfone building blocks and polyaryl ether building blocks and can be obtained by thermal polycondensation using potassium carbonate and a temperature of 190°C.

EP-A 135 130 describes a process for preparing linear polyarylene polyethers, in which alkali metal double salts of dihydric phenols are reacted in equimolar amounts with a dihalobenzene compound. The reaction is carried out in N-methylpyrrolidone with heating and anhydrous potassium carbonate is added.

The abovementioned documents of the prior art disclose both the suitable starting materials, catalysts and solvents and suitable ratios of the participating materials and suitable reaction times and reaction parameters, e.g. reaction temperatures and reaction pressures, and also suitable work-up methods.

However, in all the processes mentioned, the condensation has to be carried out at high temperature, i.e. generally above 160° C. (and mostly above 140° C.), for a number of hours in order to achieve suitable molecular weights. The polyaryl ethers obtained therefore have a yellowish intrinsic color which can be characterized, for example, by means of the yellowness index.

It is an object of the present invention to provide an improved process for preparing polyaryl ethers. The process should be performable cheaply and lead to products having improved color properties.

It has long been known from the literature that reactions can also proceed at an accelerated rate under the action of radiation in the microwave region (see Gedye, R. et al. Tetrahedron Letters 1986, 27, 279; Chatti, S. et al., European Polymer Journal 2002, 38, 1851).

In the context of the present invention, the term microwaves encompasses decimeter, centimeter and millimeter waves. Microwaves are electromagnetic waves whose wavelength is in the range from 1 m to 1 mm, which corresponds to a frequency range from about 300 MHz to about 300 GHz.

Microwaves are used, for example, in radar technology, in microwave ovens and in many industrial applications such as plasma units, wireless communication systems or sensor systems.

Owing to their wavelength, microwaves are particularly suitable for the excitation of dipole and multipole vibrations of molecules. They can therefore accelerate chemical reactions.

This effect is particularly apparent in the vibrational excitation of water molecules in a microwave oven. The heating of water is based not on a particular resonance frequency, but instead the water molecules as dipoles attempt to continually align themselves with the alternating electromagnetic field, resulting in evolution of heat as dielectric loss.

Microwaves having different frequencies and powers can, for example, be generated by means of velocity-modulated tubes (klystrons or magnetrons). Magnetrons are frequently used in microwave ovens in order to generate microwaves in the range up to 500 W.

Microwave reactors can in principle also be used for preparing polymers (see S. Mallakpour et al., Journal of Applied Polymer Science, 2005, 96, 435; S. A. Scrinivasan et al., Journal of Applied Polymer Science 1997, 64, 179), but problems also occur in the polymerization when microwaves are employed. Thus, a polymerization can, for example, proceed incompletely or lead to an unfavorable molecular weight distribution.

BRIEF SUMMARY OF THE INVENTION

However, it has surprisingly been found that the preparation of polyaryl ethers by nucleophilic substitution can be accelerated significantly when electromagnetic radiation in the microwave region is used. The invention accordingly provides a process for preparing polyaryl ethers, wherein a polycondensation of the monomer building blocks is carried out using microwave irradiation.

In addition, the products obtained have a significantly improved intrinsic color. Compared to the products polycondensed by means of a thermal reaction, the products produced with the same viscosity number by a microwave-aided reaction have improved processing stability and a reduced oligomer content.

The molding compositions which can be prepared by the process of the invention comprise the polyaryl ether or ethers (component A) in a proportion of from 5 to 100% by weight, in particular from 5 to 99.8% by weight, usually from 5 to 98% by weight, preferably from about 20 to 96% by weight.

Polyaryl ethers (component A) which can be prepared according to the invention are preferably made up of recurring units of the general formula (I)

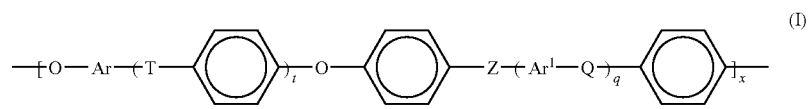

where x is 0.5 or 1, t and q are each, independently of one another, 0, 1, 2 or 3, Q, T, Y and Z are each, independently of one another, a chemical bond or a group selected from among —O—, —S—, —SO$_2$—, S═O, C═O, —N═N—, —R$^a$C═CR$^b$— and —CR$^c$R$^d$—, where R$^a$ and R$^b$ are each, independently of one another, a hydrogen atom or a C$_1$-C$_{12}$-alkyl group and R$^c$ and R$^d$ are each, independently of one another, a hydrogen atom or a C$_1$-C$_{12}$-alkyl, C$_1$-C$_{12}$-alkoxy or C$_6$-C$_{18}$-aryl group, where R$^c$ and R$^d$ are optionally substituted independently by fluorine and/or chlorine atoms or may together with the carbon atom to which they are bound form a C$_3$-C$_{12}$-cycloalkyl group which is optionally substituted by one or more C$_1$-C$_6$-alkyl groups, with the proviso that at least one of the groups T, Q and Z is —SO$_2$— or C═O and, when t and q are each 0, Z is —SO$_2$— or C═O, Ar, Ar$^1$ are each, independently of one another, a C$_6$-C$_{18}$-arylene group which is optionally substituted by C$_1$-C$_{12}$-alkyl, C$_6$-C$_{18}$-aryl, C$_1$-C$_{12}$-alkoxy groups or halogen atoms.

It is also possible for different units of the formula (I) to be distributed randomly or in blocks in the polyaryl ether.

DETAILED DESCRIPTION OF THE INVENTION

Further preferred polyaryl ethers which can be prepared according to the invention are made up of recurring units of the general formula (I):

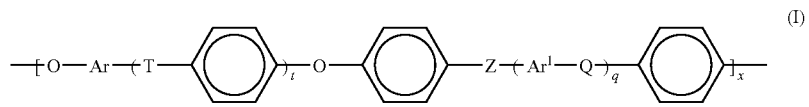
(I)

in which
x is 0.5 or 1,
t and q are each, independently of one another, 0, 1, 2 or 3,
Q, T, Y and Z are each, independently of one another, a chemical bond or a group selected from among —O—, —SO$_2$—, C═O,
with the proviso that at least one of the groups T, Q and Z is —SO$_2$— or C═O and, when t and q are each 0, Z is —SO$_2$— or C═O,
Ar, Ar$^1$ are each, independently of one another, a C$_6$-C$_{12}$-arylene group which may optionally be substituted by C$_1$-C$_{12}$-alkyl, C$_6$-C$_{18}$-aryl, C$_1$-C$_{12}$-alkoxy groups or halogen atoms.

Preferred polyaryl ethers which can be prepared according to the invention are made up of recurring units of the general formula (I) in which 0, T, Y and Z are each, independently of one another, a chemical bond or an —O—, —SO$_2$— or C═O group and Ar and Ar$^1$ are each a 1,4-phenylene group.

The preparation of polyaryl ethers A having such a structure by thermal reaction is described, for example, in GB-A 1 153 035 and U.S. Pat. No. 4,870,153. The classical thermal process conditions for the synthesis of polyaryl ethers are described, for example, in EP-A 0 113 112 and EP-A 0 135 130. A description is given of, for example, the reaction of the monomers in aprotic polar solvents in the presence of anhydrous alkali metal carbonate.

A preferred combination is N-methylpyrrolidone as solvent and potassium carbonate as catalyst.

The reaction in the melt is likewise known.

Examples of suitable polyaryl ethers A are those comprising at least one of the following recurring structural units I$_1$ to I$_{29}$:

when x=0.5 in formula (I):

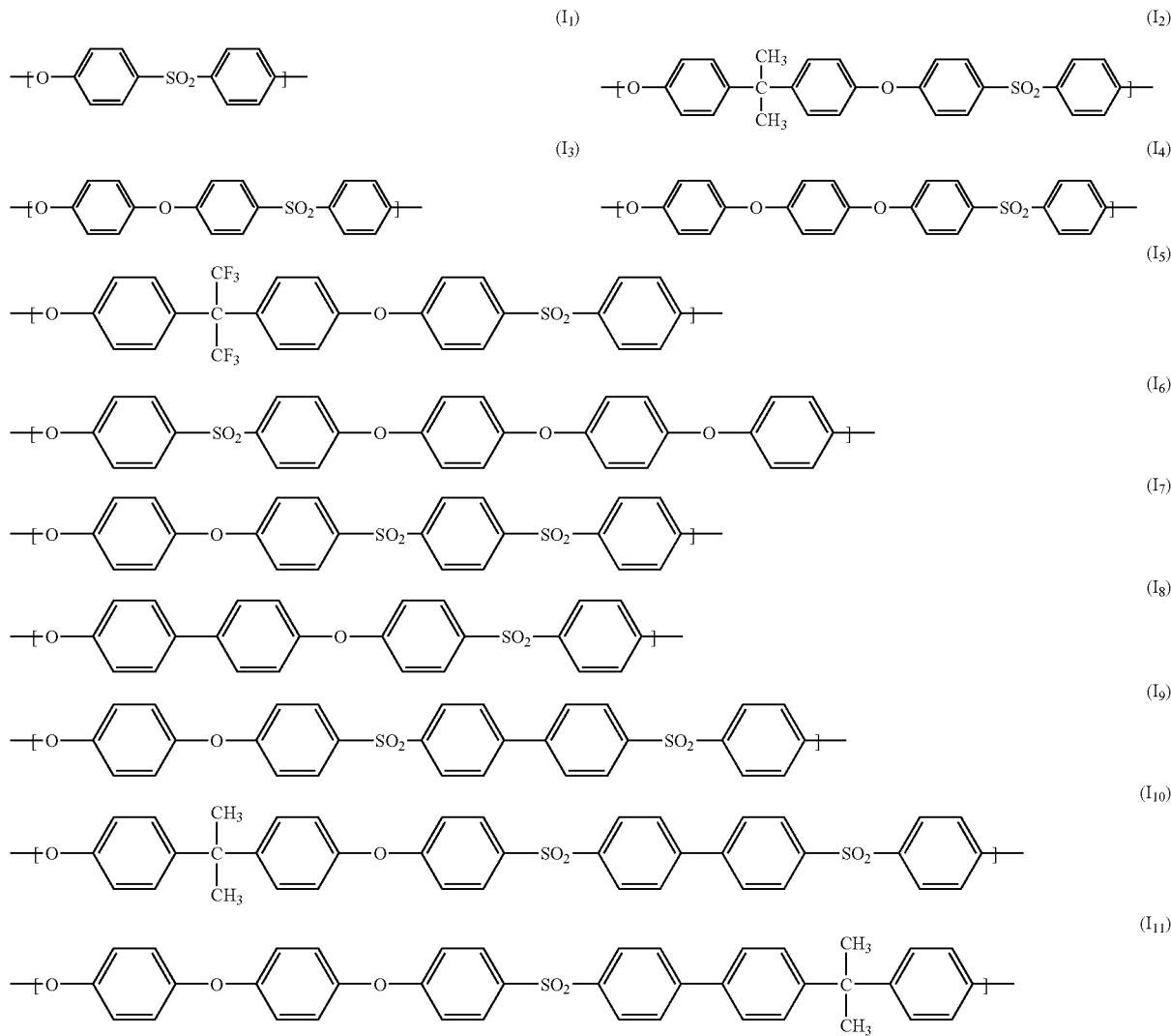

-continued
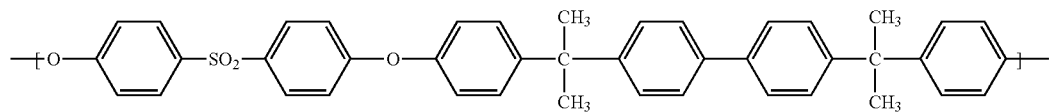
(I₁₂)
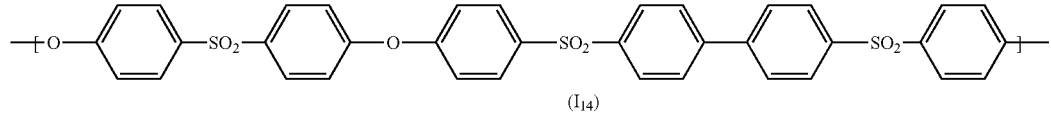
(I₁₃)
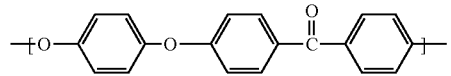
(I₁₄)
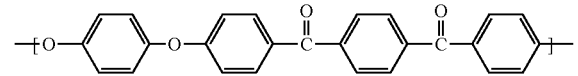
(I₁₅)
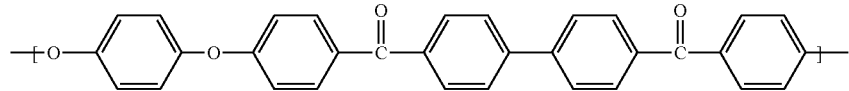
(I₁₆)
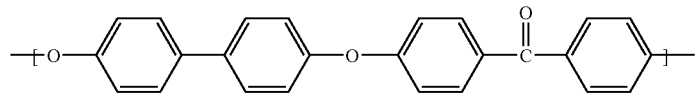
(I₁₇)
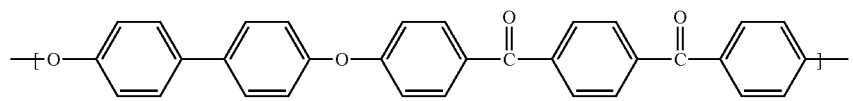
(I₁₈)
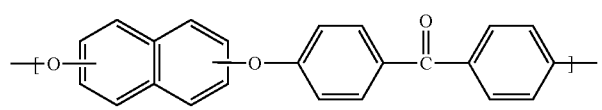
(I₁₉)
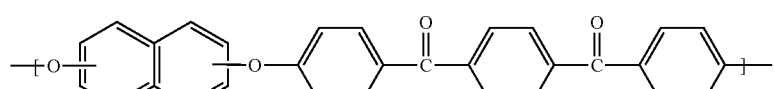
(I₂₀)
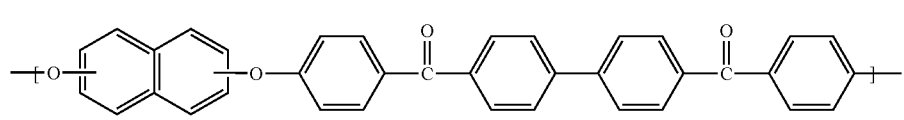
(I₂₁)
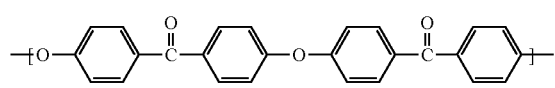
(I₂₂)
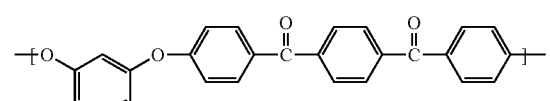
(I₂₃)
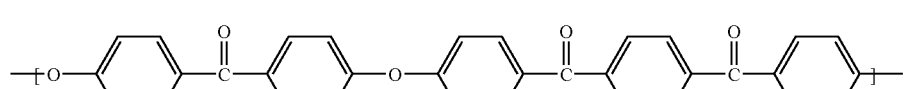
(I₂₄)
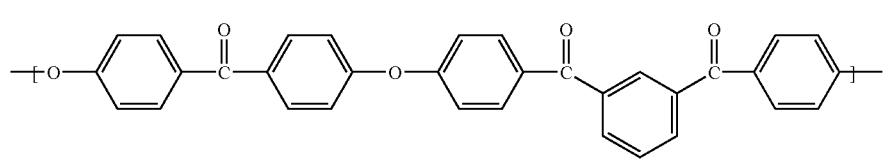
(I₂₅)
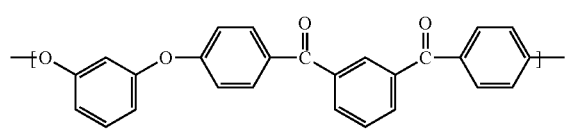
(I₂₆)
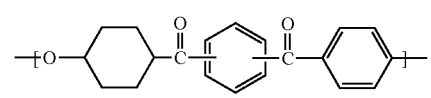
(I₂₇)

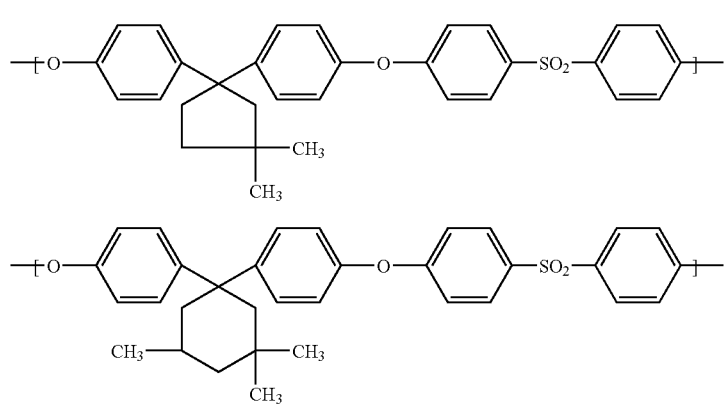

(I_{28})

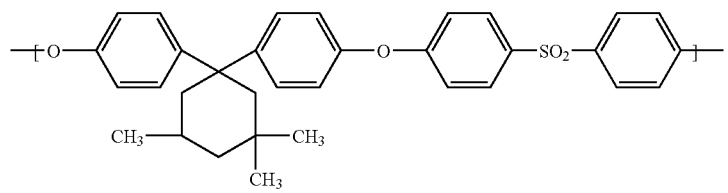

(I_{29})

As particularly preferred units of the formula (I), mention may be made of units of the formulae $(I_1)$, $(I_2)$ and $(I_8)$, which can be present either individually or in admixture.

Further preferred polyaryl ethers which can be prepared according to the invention comprise recurring units having at least one of the structures $I_1$, $I_2$ and $I_8$.

The polyaryl ethers A can also be copolymers or block copolymers in which polyarylene ether segments and segments of other thermoplastic polymers, e.g. polyamides, polyesters, aromatic polycarbonates, polyester carbonates, polysiloxanes, polyimides or polyetherimides, are present.

The molecular weights (number average) of the blocks or graft arms in the copolymers are generally in the range from 1000 to 30 000 g/mol. The blocks of different structures can be arranged alternately or randomly. The proportion by weight of the polyaryl ethers in the copolymers or block copolymers is generally at least 10% by weight. The proportion by weight of the polyaryl ethers can be up to 99.8% by weight, in particular 97% by weight. Preference is given to copolymers or block copolymers having a proportion by weight of polyaryl ether of up to 90% by weight. Particular preference is given to copolymers or block copolymers comprising from 20 to 80% by weight of polyaryl ether.

In general, the polyaryl ethers have average molecular weights $M_n$ (number average) in the range from 5000 to 60 000 g/mol and relative viscosities of from 0.20 to 0.95 dl/g. The relative viscosities are, depending on the solubility of the polyaryl ethers, measured either in 1% strength by weight N-methylpyrrolidone solution, in mixtures of phenol and dichlorobenzene or in 96% strength sulfuric acid at 20° C. or 25° C.

As further component D, the thermoplastic molding compositions of the invention comprise from 0 to 50% by weight, preferably from 0 to 45% by weight and in particular from 0 to 40% by weight, of additives such as fillers and reinforcing materials or impact-modifying rubbers.

The molding compositions comprising the polyaryl ethers prepared according to the invention can also comprise other components, in particular auxiliaries such as processing aids, pigments, stabilizers or mixtures of various additives.

The molding compositions can comprise, for example, from 0 to 45% by weight, in particular from 0 to 40% by weight, of fibrous or particulate fillers or reinforcing materials or mixtures of these. The amounts indicated are in each case based on the total mass of the components.

Preferred fibrous fillers or reinforcing materials are carbon fibers, potassium titanate whiskers, aramid fibers and particularly preferably glass fibers. When glass fibers are used, these can have been provided with a size, preferably a polyurethane size, and a adhesion promoter to improve compatibility with the matrix material. In general, the carbon and glass fibers used have a diameter in the range from 6 to 20 μm.

The glass fibers can be incorporated either in the form of short glass fibers or in the form of continuous strands (rovings). The average length of the glass fibers in the finished injection molding is preferably in the range from 0.08 to 0.5 mm. Carbon or glass fibers can also be used in the form of woven fabrics, mats or fiberglass rovings.

Suitable particulate fillers are amorphous silica, carbonates such as magnesium carbonate (chalk), powdered quartz, mica, a variety of silicates such as clays, muscovite, biotite, suzoite, tin maletite, talc, chlorite, phlogophite, feldspar, calcium silicates, such as wollastonite, or aluminum silicates such as kaolin, in particular calcined kaolin.

In a further embodiment, particulate fillers in which at least 95% by weight, preferably at least 98% by weight, of the particles have a diameter (largest dimension), determined on the finished product, of less than 45 μm, preferably less than 40 μm, and whose aspect ratio is in the range from 1 to 25, preferably in the range from 2 to 20, determined on the finished product, are used.

The particle diameters can, for example, be determined by recording electron micrographs of thin sections of the polymer mixture and employing at least 25, preferably at least 50, filler particles for the evaluation. The determination of the particle diameters can likewise be carried out by means of sedimentation analysis, for example as described in "Transactions of ASAE", page 491 (1983). The proportion by weight of fillers smaller than 40 μm can also be measured by means of sieve analysis. The aspect ratio is the ratio of particle diameter to thickness (largest dimension to smallest dimension).

Talc, kaolin such as calcined kaolin or wollastonite, or mixtures of two or all of these fillers are particularly preferred as particulate fillers. Among these, particular preference is given to talc having a proportion of at least 95% by weight of particles having a diameter of less than 40 μm and an aspect ratio of from 1.5 to 25, in each case determined on the finished product. Kaolin preferably has a proportion of at least 95% by weight of particles having a diameter of less than 20 μm and an aspect ratio of from 1.2 to 20, in each case determined on the finished product.

The molding compositions of the invention can also comprise auxiliaries or additives such as processing aids, pigments, stabilizers, flame retardants or mixtures of different additives as further component E.

Customary additives also include, for example, oxidation inhibitors, agents to prevent thermal decomposition and decomposition by ultraviolet light, lubricants and mold release agents, dyes and plasticizers.

According to the invention, they are present in a proportion of from 0 up to 30% by weight, preferably from 0.2 to 30% by weight, more preferably from 0 up to 20% by weight, in particular from 0 to 15% by weight, based on the total weight of the components. If component E comprises stabilizers, the proportion of these stabilizers is usually up to 2% by weight, preferably from 0.01 to 1% by weight, in particular from 0.01 to 0.5% by weight, based on the total weight of A to E.

Pigments and dyes are generally present in amounts of up to 6% by weight, preferably from 0.05 to 5% by weight and in particular from 0.1 to 3% by weight, based on the sum of all components.

Pigments for coloring thermoplastics are generally known; see, for example, R. Gächter and H. Müller, Taschenbuch der Kunststoffadditive, Carl Hanser Verlag, 1983, pages 494 to 510. A first preferred group of pigments is white pigments such as zinc oxide, zinc sulfide, white lead [2 $PbCO_3.Pb(OH)_2$], lithopone, antimony white and titanium dioxide. Of the two most common crystal modifications of titanium dioxide (rutile and anatase), especially the rutile form is used for white pigmentation of the molding compositions of the invention. Black pigments which can be used according to the invention are iron oxide black ($Fe_3O_4$), spinel black
[$Cu(Cr, Fe)_2O_4$], manganese black (mixture of manganese dioxide, silicon dioxide and iron oxide), cobalt black and antimony black and particularly preferably carbon black which is usually used in the form of furnace black or gas black [on this subject, see G. Benzing, Pigmente für Anstrichmittel, Expert-Verlag (1988), pages 78 ff.].

To obtain particular color shades, it is possible according to the invention to use inorganic color pigments such as chromium oxide green or organic color pigments such as azo pigments or phthalocyanines. Such pigments are generally commercially available.

Oxidation inhibitors and heat stabilizers which can be added to the thermoplastic compositions of the invention are, for example, halides of metals of group I of the Periodic Table, for example sodium, potassium, lithium halides, for example chlorides, bromides or iodides. It is also possible to use zinc fluoride and zinc chloride.

It is also possible to use sterically hindered phenols, hydroquinones, substituted representatives of this group, secondary aromatic amines, if appropriate in combination with phosphorus-comprising acids or their salts, and mixtures of these compounds, preferably in concentrations of up 1% by weight, based on the weight of the total composition.

Examples of UV stabilizers are various substituted resorcinols, salicylates, benzotriazoles and benzophenones, which are generally used in amounts of up to 2% by weight.

Lubricants and mold release agents, which are generally added in amounts of up to 1% by weight to the thermoplastic composition, are stearyl alcohol, alkyl stearates and stearamides and also esters of pentaerythritol with long-chain fatty acids. It is also possible to use dialkyl ketones, for example distearyl ketone.

Further possible additives are nucleating agents, for example talc.

Further embodiment of the invention provides a process in which the reaction mixture comprising the monomer building blocks is brought to a temperature of from 120° C. to 280° C., preferably to a temperature of from 120° C. to 250° C., by irradiation with microwaves having frequencies in the range from 0.1 GHz to 100 GHz in the polycondensation reaction.

One embodiment of the invention provides a process in which a solvent and, if appropriate, a component which scavenges the water formed are used in the polycondensation.

A further embodiment of the invention provides a process in which at least two different monomer building blocks are used in the polycondensation, with at least one dihalo(diaryl sulfone) and at least one dihydroxy(diaryl sulfone) and/or bisphenol A being used.

The invention also provides polyaryl ethers which can be prepared by a process as described above. A further embodiment of the invention provides a thermoplastic molding composition comprising, based on the total weight of the molding composition, the following components:
a) from 5 to 99.8% by weight of at least one polyaryl ether which has been prepared from the monomer building blocks using microwave irradiation,
b) from 0 to about 60% by weight of fibrous or particulate fillers or reinforcing materials and
c) from 0.2 to about 30% by weight of further additives.

A further embodiment of the invention provides a thermoplastic molding composition comprising, based on the total weight of the molding composition, the following components:
a) from 20 to 96% by weight of at least one polyaryl ether which has been prepared by a process according to any of claims 1 to 9,
b) from 1 to about 50% by weight of fibrous or particulate fillers or reinforcing materials and
c) from 3 to about 30% by weight of further additives.

The invention further provides for the use of thermoplastic molding compositions as described above for producing fibers, films and moldings. It also provides the fibers, films and moldings produced using a molding composition as described above.

A further embodiment of the invention provides a molding selected, in particular, from among household articles, electronic components, laboratory equipment, medical equipment or parts thereof.

The molding compositions of the invention can be produced by processes known per se, for example by means of extrusion. The molding compositions can, for example, be produced by mixing the starting components A and, if appropriate, D and E in customary mixing apparatuses, e.g. screw extruders, preferably twin-screw extruders, Brabender mills or Banbury mills or kneaders and subsequently extruding them. The extrudate is usually cooled and broken up after extrusion.

The molding compositions of the invention can preferably also be produced by precipitating the components from a solution comprising the components A in a solvent (S) (for example N-methylpyrrolidone) and subsequently extracting them if appropriate and only then mixing them, if appropriate, with the components D and E in customary mixing apparatuses and subsequently extruding the mixture.

The order in which the components are mixed can be varied. Thus, it is possible to premix two or, if appropriate, three components or to mix all components at the same time. Components A can also be premixed in the solution. The addition of the components D and E may, if appropriate, be effected via the molten state.

To obtain a very homogeneous molding composition, intensive mixing is advantageous. In general, average mixing times of from 0.2 to 30 minutes, in particular from 1 to 20 minutes, at temperatures of from 280° to 420°, preferably from 290° to 380°, are necessary for this.

The molding compositions of the invention have good mechanical properties, good flowability, improved toughness, especially elongation at break and notched impact toughness, and an improved intrinsic color. The molding compositions of the invention are therefore suitable for producing moldings for household articles, electrical or electronic components and also moldings for the vehicle sector.

The invention is illustrated by the following examples.

EXAMPLES

Properties of the Molding Compositions

The viscosity number of the polyaryl ether sulfones is determined in 1% strength solution in N-methylpyrrolidone at 25° C.

The heat distortion resistance of the samples is determined in accordance with ISO 306 (Vicat B) (loading: 50 N, temperature increase of 50 K per hour, on ISO bars).

The notched impact toughness of the products is determined in accordance with ISO 179 1 eB.

The elongation at break of the materials is determined in accordance with ISO 527. The flowability of the products is determined by measurement in a capillary rheometer at 370° C.

The melt stability of the products is determined by measuring the melt viscosity in a plate-plate rheometer at 400° C. Here, the change in the viscosity determined at 55 Hz over a period of 5 or 60 minutes is examined.

$$\Delta = \frac{\eta_{60'} - \eta_{5'}}{\eta_{5'}}$$

$\eta_{60'}$: viscosity after 60 min $\eta_{5'}$: viscosity after 5 min

Measurement Methods:

To assess the optical properties of the products, injection-molded test specimens (circular disks, diameter: 60 mm, thickness: 2 mm) were produced at a melt temperature of 310° C. (for polysulfones (PSU)) or 350° C. (for polyether sulfones (PES)) and a mold temperature of 140° C. Measurement of the transmission and haze was carried out in accordance with the standard ASTM D 1003.

The surface quality is determined visually on plates and classified within the range from 1 (very good) to 6 (unsatisfactory).

The intrinsic color of the products was determined as the yellowness index (YI) in accordance with the standard DIN 6167.

Example 1

Comparative Experiments on Thermal Polycondensation

In a 4 l reactor provided with internal thermometer, gas inlet tube and reflux condenser with water separator, the dried monomers, (for experiment 1:1) dichloro(diphenyl sulfone) (DCDPS) and bisphenol A or (for experiment 1.2) DCDPS and dihydroxy(diphenyl sulfone) (DHDPS), were combined in such amounts that a 1.5 mol % excess of DCDPS and a 5 mol % excess of dried potassium carbonate were present under a nitrogen atmosphere, dissolved in N-methylpyrrolidone (NMP) (monomer concentration: 1.9 mol/l) with stirring and heated to 190° C.

The reaction time is taken as the residence time at 190° C. The water of reaction is distilled off and the fill level is kept constant during the reaction by addition of NMP.

The reaction is stopped by dilution with cold NMP, and methyl chloride (10 l/h) is subsequently passed into the mixture at 140° C. for 45 minutes. Nitrogen is then introduced (20 l/h) and the mixture is cooled. The potassium chloride formed is filtered off and the polymer solution is precipitated in water. The product is subsequently extracted with water having a temperature of 80° C. for 24 hours and then dried at 120° C. under reduced pressure. The powder obtained is then pelletized on a twin-screw extruder. The polymer viscosity is measured as the viscosity number (VN/ml/g).

Example 2

Preparation of the Polyaryl Ethers According to the Invention in a Microwave Reactor A 50 ml flask provided with a precision glass stirrer and water removal was charged in example 2.2 with 20 ml of NMP, 11.483 g of DCDPS, 9.857 g of DHDPS and 5.804 g of anhydrous potash (potassium carbonate) and introduced into a single-mode microwave oven with Powemax® Technology. The reaction mixture was brought to 190° C. by irradiation with microwaves (70 W). After 3 hours, the reaction was stopped. The polymers obtained were isolated by precipitation in water, extraction of the powder obtained with hot water and subsequent drying.

A number of experiments were carried out.

Corresponding experiments on the preparation of polysulfone were also carried out as example 2.1. The starting materials used here were: 20 ml of NMP, 11.483 g of DCDPS, 8.991 g of bisphenol A and 5.804 g of anhydrous potash.

The results of the tests on the polymers prepared by thermal treatment or by microwave irradiation are shown in tables 1 and 2.

TABLE 1

Experimental results for polysulfone

| | Experiment 1.1 | Experiment 1.1 | Experiment 2.1 | Experiment 2.1 |
|---|---|---|---|---|
| Reaction time (hours) | 4 | 5 | 3 | 2.5 |
| VN [ml/g] | 47 | 52 | 54 | 51 |
| Transmission [%] | 86 | 85 | 89 | 90 |
| Haze [%] | 3.8 | 4.0 | 1.7 | 1.6 |
| YI | 21 | 23 | 11 | 10 |
| Microwave irradiation | — | — | Yes | Yes |
| Melt stability | 1.67 | 1.56 | 1.23 | 1.30 |

TABLE 2

Experimental results for polyether sulfone

| | Experiment 1.2 | Experiment 1.2 | Experiment 2.2 | Experiment 2.2 |
|---|---|---|---|---|
| Reaction time (hours) | 3.5 | 5 | 2 | 2.5 |
| VN [ml/g] | 48 | 56 | 51 | 61 |
| Transmission [%] | 82 | 81 | 86 | 86 |
| Haze [%] | 6.5 | 7.2 | 2.6 | 2.7 |
| YI | 35 | 39 | 17 | 19 |

TABLE 2-continued

Experimental results for polyether sulfone

| | Experiment 1.2 | Experiment 1.2 | Experiment 2.2 | Experiment 2.2 |
|---|---|---|---|---|
| Microwave irradiation | — | — | Yes | Yes |
| Melt stability | 1.78 | 1.65 | 1.31 | 1.34 |

It can be seen from these measured results that the syntheses carried out under the action of microwaves lead to products having higher molecular weights at a shorter reaction time. Furthermore, the polymers according to the invention display a better melt stability.

The invention claimed is:

1. A process for preparing polyaryl ethers, which comprises carrying out a polycondensation reaction of monomer building blocks using microwave irradiation, and wherein the polyaryl ethers prepared comprise recurring units having at least one of the following structures $1_1$, $1_2$ and $1_8$:

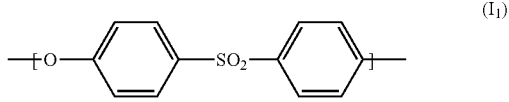

(I$_1$)

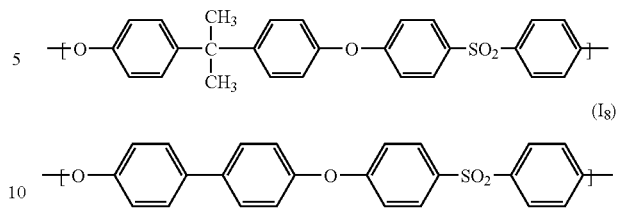

(I$_2$)

(I$_8$)

with the proviso that the polyaryl ethers do not contain C=O groups.

2. The process according to claim 1, wherein the reaction mixture comprising the monomer building blocks is brought to a temperature of from 120° C. to 280° C. by irradiation with microwaves having frequencies in the range from 0.1 GHz to 100 GHz in the polycondensation reaction.

3. The process according to claim 1, wherein a solvent and optionally a component which scavenges the water formed are used in the polycondensation.

4. The process according to claim 1, wherein at least two different monomer building blocks are used in the polycondensation, with at least one dihalo(diaryl sulfone) and at least one dihydroxy(diaryl sulfone) and/or bisphenol A being used.

5. The process according to claim 1, wherein said recurring units having at least one structure $1_1$.

6. The process according to claim 1, wherein said recurring units having at least one structure $1_2$.

7. The process according to claim 1, wherein said recurring units having at least one structure $1_8$.

* * * * *